Figure 1:
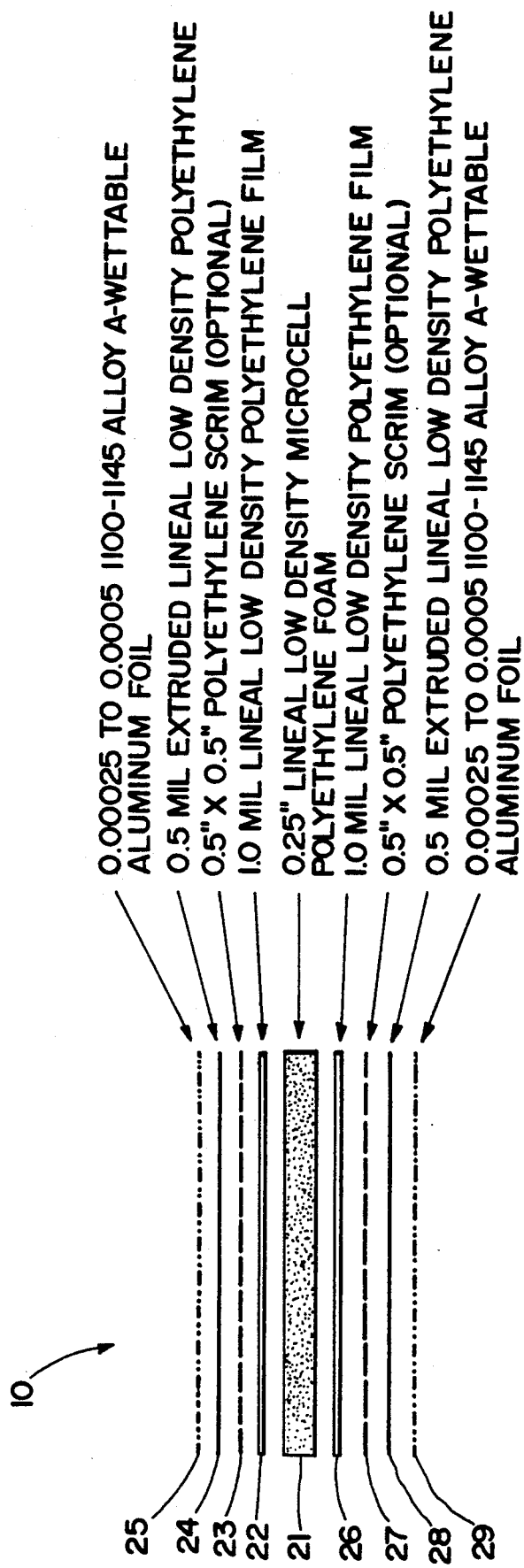

United States Patent [19]
Groft et al.

[11] Patent Number: 5,316,835
[45] Date of Patent: May 31, 1994

[54] LOW EMISSIVITY INSULATION

[76] Inventors: Cory L. Groft, 650 Rife Rd., East Berlin, Pa. 17316; Thomas W. Dauber, R.D. 2, Box 2387, Spring Grove, Pa. 17362

[21] Appl. No.: 977,043

[22] Filed: Nov. 16, 1992

[51] Int. Cl.$^5$ .............. B32B 15/08; B32B 27/12; B32B 27/32
[52] U.S. Cl. ................. 428/247; 428/315.5; 428/317.7; 428/319.7; 428/319.9; 428/462; 428/517
[58] Field of Search ........... 428/247, 255, 315.5, 428/317.7, 318.6, 319.7, 319.9, 517, 461, 462

[56] References Cited

U.S. PATENT DOCUMENTS

| | | | |
|---|---|---|---|
| 3,499,819 | 3/1970 | Lewis | 428/317.7 |
| 4,073,998 | 2/1978 | O'Connor | 428/317.7 |
| 4,121,958 | 10/1978 | Koonts | 156/79 |
| 4,271,218 | 6/1981 | Heckel et al. | 428/36 |
| 5,100,725 | 3/1992 | Pearson | 428/314.4 |

Primary Examiner—George F. Lesmes
Assistant Examiner—Christopher Brown
Attorney, Agent, or Firm—Daniel J. O'Connor

[57] ABSTRACT

A multi-layer insulation product which achieves low emissivity values by using at least one layer of metallic foil. The metallic foil (25, 29) is used at exterior locations of the insulation product by way of novel strengthening means positioned below said metallic foil. A central layer of foamed material (21) adds to the insulative effect. The strengthening features of the invention allow use of the insulation product on exterior locations which has not heretofore been possible in the art.

1 Claim, 1 Drawing Sheet

LOW EMISSIVITY INSULATION

BACKGROUND AND OBJECTS OF THE INVENTION

This invention is generally related to the insulation arts and, in particular, to a novel type of low emissivity insulation having a very high degree of structural integrity and useability.

The use of foamed and blown-in insulation materials has found widespread usage in the construction industry in recent years. Fiberglass or foamed insulation materials improve heat loss or gain due to the conductive or convective components of heat transfer.

However, radiant energy transfer is virtually unaffected by such fiberglass or foamed insulation products.

Typical insulation systems slow down convection and conduction, but have little effect on radiant energy which can account for up to 93% of summer heat gain and up to 75% of winter heat loss.

Furthermore, many currently used insulation materials are environmentally hazardous and thus must be used in sealed areas such as attics or within walls. Many types of insulation used today are difficult to work with and require numerous and expensive precautions against respiratory harm to installers.

Some prior art systems have taught the use of metal foils as part of an energy barrier for home usage. However, such usage has been limited to internal wall or floor usage since metal foils, such as aluminum, are easily torn or damaged.

An aluminum or other metal foil structure has not heretofore been shown in the prior art which has sufficiently high structural integrity that it may also be used in an external manner, i.e. as a cover for air conditioners, pipes, garage doors, hot water heaters, or other items.

Accordingly, it is an object of the present invention to demonstrate an insulative layered structure which is fully environmentally safe for both installing contractors and other end users.

It is also an object of the invention to set forth insulation which greatly reduces radiant energy transfer in buildings or other products.

It is a further object of the invention to illustrate a low-emissivity insulation which may be economically manufactured for widespread distribution and commercial use.

It is a still further object of the invention to set forth an insulation construction which may be easily and quickly installed to greatly reduce labor time and costs.

It is also an object of the invention to demonstrate a novel insulation which has a high degree of structural integrity, which is light weight and which has very thin dimensions for widespread use in home and product locations.

It is a further object of the present invention to set forth an insulation which also serves as a vapor barrier in addition to its insulative function.

These and other objects and advantages of the present invention will be apparent to those of skill in the art from the description which follows.

PRIOR ART PATENTS

The prior art which is considered to be most relevant to the Present invention are the U.S. Patents listed below:

U.S. Pat. No. 5,137,764 issued to Doyle for an invention entitled "Floor structure incorporating a vapor and gas barrier", U.S. Pat. No. 4,974,382 issued to Avellanet for an invention entitled "Infiltration and energy barrier", U.S. Pat. No. 4,310,587 issued to Beaupre for an invention entitled "Fire resistant vapor barrier".

The above U.S. Patents illustrate some of the components of the present invention. For example, the use of metal foil layers and scrim layers have been described in the prior art.

However, the particular novel structural combination of the invention is not shown or suggested in the prior art.

The above prior art also illustrates that the use of aluminum foil in the prior art is limited to internal wall or floor locations. Such is presumably because of the inherent fragile nature of metal foil.

In contrast, the present invention incorporates strengthening features in an overall design which thereby lends the products to many more uses than has heretofore been known in the art.

That is, because of the durable nature of the invention components, the end product may be used also for external insulative needs, e.g. for air conditioner protective covers, pipes, camping, equipment heating or cooling needs, hot water heaters and many other uses.

The invention is thus believed to be a major improvement over prior art layered insulation constructions.

BRIEF SUMMARY OF THE INVENTION

The invention includes a layer of polyethylene foam which serves as a support for the other added component layers. Polyethylene foam or equivalent polypropylene foam may be utilized, both being in the chemical family designated as polyolefins.

A thin layer of aluminum foil is bonded indirectly to one or both sides of said foam layer.

Thin polyethylene layers are placed between the aluminim foil and the foamed layer. The thin polyethylene is bonded to the aluminum foil layer to greatly improve its resistance to tearing. This strengthening feature means that the end product has a much wider use than has been known in the art.

A layer of strengthening scrim may be added to further enhance the product integrity.

In practice of the invention, both sides of the foam layer may be covered with layers as described above. The end product may thus appear identical on either side with the aluminum foil layers being externally located.

Thus, use and installation is simplified since the product may be used with either side facing out since both external faces are identical.

The resulting bonded layers are easily rolled, transported and installed without requiring special tools or environmental precautions which must be taken with many insulations.

BRIEF DESCRIPTION OF THE DRAWING FIGURES

The single drawing FIG. 1 shows the various layers in a schematic separated view for best illustration.

In practice of the invention, the various layers would be adjoining each other after being flame or heat roller laminated together.

FULL DESCRIPTION OF THE PREFERRED EMBODIMENT

Referring now to the drawing FIG. 1, the various layers of the preferred embodiment are shown in separated form for best illustration. In practice, the various layers would be heat or flame laminated together into a single insulative construction 10.

A central foam layer 21 is comprised of polyethylene or polypropylene or equivalent and is on the order of 0.25 inches thick. Various thicknesses may of course be used and fall within the intended scope of the invention.

Bonded to the sides of foam layer 21 are film layers 22 and 26. These film layers 22 and 26 are preferably comprised of 1.0 mil lineal low density polyethylene film or other equivalent material.

Outside of said film layers 22 and 26 are optional layers of scrim 23 and 27 which are made of polyethylene. Scrim is a term known in the art to consist of crossed lines of plastics material which serve to strengthen the overall product and to prevent stretching damage to the layers.

Outside of the scrim layers 23 and 27 are two more identical layers 24 and 28 which may comprise layers of 0.5 mil extruded lineal low density polyethylene or other equivalent material.

The outermost layers shown in FIG. 1 are the aluminim foil layers 25 and 29. The specificatios for such layers 25 and 29 are 0.00025 to 0.0005 1100–1145, alloy A-wettable aluminum foil. Such specifications inducate a high purity aluminum foil which has a very low emissivity.

In practice of the invention, emissivity values of 0.03 have been achieved which means that 97% of the radiant heat energy is reflected back from the insulation 10. Such low emissivity values have resulted in the invention's significant commercial success.

The strengthening layers 22, 24, 26 and 28 have allowed the use of aluminum foil by giving it a tear and puncture resistance which foil does not have by its inherent nature.

The scrim layers 23 and 27 further serve to strengthen the end product by providing stretch resistance.

The important of these strengthening and structural features can be appreciated when such problems as shipping, installing and using the product are considered.

Any potential shipping damages are greatly reduced by reason of product strength.

Installing the insulation of the present invention is greatly simplified by reason of its light weight, its resistance to damage by installers and its complete safety in an environmental sense.

The strengthened outer aluminum foil layers mean that the resultant product can be used in many applications other than internal wall or floor structures. Prior art foil systems have been restricted to such internal uses by reason of the inherent destructibility of metal foils.

For example, the present invention is easily applied to the exterior locations of hot water heaters, pipes and ducts, air conditioners, keg coolers and hot or cold camping devices. That is, the invention has use in conjunction with any product which requires the enhanced insulative properties of a strengthened metal foil design.

The various layers of the described invention also provide an excellent vapor barrier if needed. In home uses, the present invention could be used in place of conventional vapor barriers by reason of its thinness and have the added beneficial effect of greatly reducing radiant energy transfer in the wall.

Many other uses of the described invention will be apparent to those of skill in the art and it is intended to cover all uses of the basic product in this specification.

In some uses of the present inventive concepts, it has been found acceptable to use the upper structure of the layers shown in FIG. 1. In this alternate usage, only layers 21-25 would be manufactured and used. This modified product usage would have many of the same advantages of the double-foil structure of FIG. 1. For example, lowered emissivity would be achieved and the aluminum foil layer 25 would be sufficiently strengthened to allow its use on products externally. This single-foil usage would of course have the advantage of being more economical for the consumer.

The materials described herein have been tested under the appropriate fire and building code standards by United States Testing Co. and have been deemed to be fully satisfactory.

While the layered materials have been specifically named above, it is intended to cover all equivalent materials which would reasonably occur to those of skill in the art. Such materials are intended to be covered within the spirit and scope of the present invention.

We claim:

1. A multi-layer insulation product which achieves low emissivity ratings and enhanced product strength comprising:
   a) a layer of foamed material (21),
   b) three upper strengthening layers (22, 23, 24) positioned above said foamed material (21),
   c) three lower strengthening layers (26, 27, 28) positioned below said foamed material (21),
   d) a first metallic foil layer (25) positioned above said upper strengthening layers (22, 23, 24),
   e) a second metallic foil layer (29) positioned below said lower strengthening layers (26, 27, 28), wherein said layer of foamed material (21) is comprised of polyethylene or polypropylene low density microcell foam, wherein said upper strengthening layers (22, 23, 24) comprise an inner layer of polyethylene film (22), a middle polyethylene scrim layer (23) and an outer layer of low low density polyethylene (24), wherein said lower strengthening layers (26, 27, 28) comprise an inner layer of polyethylene film (26), a middle polyethylene scrim layer (27) and an outer layer of low density polyethylene (28), wherein said first metallic foil layer (25) is comprised of aluminum foil, wherein said second metallic foil layer (29) is comprised of aluminum foil, wherein each of said layers are heat or flame bonded to each other to form a unitary product (10) which may be readily used by insulation contractors.

* * * * *